(12) United States Patent
Sikora et al.

(10) Patent No.: US 7,796,896 B2
(45) Date of Patent: Sep. 14, 2010

(54) SECURE OPTICAL COMMUNICATION

(75) Inventors: Edmund S R Sikora, Ipswich (GB); Peter Healey, Ipswich (GB)

(73) Assignee: British Telecommunications plc, London (GB)

( * ) Notice: Subject to any disclaimer, the term of this patent is extended or adjusted under 35 U.S.C. 154(b) by 878 days.

(21) Appl. No.: 10/573,266

(22) PCT Filed: Sep. 29, 2004

(86) PCT No.: PCT/GB2004/004169

§ 371 (c)(1),
(2), (4) Date: Mar. 23, 2006

(87) PCT Pub. No.: WO2005/034391

PCT Pub. Date: Apr. 14, 2005

(65) Prior Publication Data

US 2007/0065150 A1     Mar. 22, 2007

(30) Foreign Application Priority Data

Sep. 30, 2003   (GB)   ................. 0322859.0

(51) Int. Cl.
*H04B 10/00* (2006.01)
(52) U.S. Cl. .............. 398/170; 398/150; 398/161
(58) Field of Classification Search ............ 398/118, 398/164, 182, 188, 150–151, 161, 169–170
See application file for complete search history.

(56) References Cited

U.S. PATENT DOCUMENTS

| | | | |
|---|---|---|---|
| 4,297,887 A | 11/1981 | Bucaro | |
| 4,370,610 A | 1/1983 | Allen et al. | |
| 4,397,551 A | 8/1983 | Bage et al. | |
| 4,443,700 A | 4/1984 | Macedo et al. | |
| 4,463,451 A | 7/1984 | Warmack et al. | |
| 4,538,103 A | 8/1985 | Cappon | |
| 4,572,949 A | 2/1986 | Bowers et al. | |
| 4,593,385 A | 6/1986 | Chamuel | |
| 4,649,529 A | 3/1987 | Avicola | |
| 4,654,520 A | 3/1987 | Griffiths | |
| 4,668,191 A | 5/1987 | Plischka | |
| 4,688,200 A | 8/1987 | Poorman et al. | |

(Continued)

FOREIGN PATENT DOCUMENTS

EP   0 251 632 A2   1/1988

(Continued)

OTHER PUBLICATIONS

International Search Report for PCT/GB2005/003680 mailed Dec. 1, 2005.

(Continued)

*Primary Examiner*—Dzung D Tran
(74) *Attorney, Agent, or Firm*—Nixon & Vanderhye PC

(57) ABSTRACT

A secure optical communication scheme uses differential delay D in an unbalanced Mach-Zehender interferometer to provide two copies of the optical source signal at a remote phase modulator separated in time by D. As D is much bigger than the coherence time source, the two copies of the signal are effectively uncorrelated. Both signals are phase-modulated by the remote sender's data and returned to the unbalanced interferometer. The phase modulator will be converted into amplitude modulation by the action of the interferometer.

35 Claims, 1 Drawing Sheet

U.S. PATENT DOCUMENTS

| | | | |
|---|---|---|---|
| 4,697,926 A | 10/1987 | Youngquist et al. | |
| 4,708,471 A | 11/1987 | Beckmann et al. | |
| 4,708,480 A * | 11/1987 | Sasayama et al. | 356/464 |
| 4,770,535 A | 9/1988 | Kim et al. | |
| 4,781,056 A | 11/1988 | Noel et al. | |
| 4,805,160 A | 2/1989 | Ishii et al. | |
| 4,847,596 A | 7/1989 | Jacobson et al. | |
| 4,855,915 A | 8/1989 | Dallaire | |
| 4,885,462 A | 12/1989 | Dakin | |
| 4,907,856 A | 3/1990 | Hickernell | |
| 4,976,507 A | 12/1990 | Udd | |
| 4,991,923 A | 2/1991 | Kino et al. | |
| 4,994,668 A | 2/1991 | Lagakos et al. | |
| 4,994,886 A | 2/1991 | Nadd | |
| 5,004,912 A | 4/1991 | Martens et al. | |
| 5,015,842 A | 5/1991 | Fradenburgh et al. | |
| 5,025,423 A | 6/1991 | Earp | |
| 5,046,848 A | 9/1991 | Udd | |
| 5,051,965 A | 9/1991 | Poorman | |
| 5,093,568 A | 3/1992 | Maycock | |
| 5,104,391 A | 4/1992 | Ingle et al. | |
| 5,140,559 A | 8/1992 | Fisher | |
| 5,173,743 A | 12/1992 | Kim | |
| 5,187,362 A | 2/1993 | Keeble | |
| 5,191,614 A | 3/1993 | LeCong | |
| 5,194,847 A | 3/1993 | Taylor et al. | |
| 5,206,924 A | 4/1993 | Kersey | |
| 5,223,967 A * | 6/1993 | Udd | 398/139 |
| 5,311,592 A | 5/1994 | Add | |
| 5,313,266 A | 5/1994 | Keolian et al. | |
| 5,319,609 A | 6/1994 | Regnault | |
| 5,351,318 A | 9/1994 | Howell et al. | |
| 5,355,208 A | 10/1994 | Crawford et al. | |
| 5,361,130 A | 11/1994 | Kersey et al. | |
| 5,363,463 A | 11/1994 | Kleinerman | |
| 5,373,487 A | 12/1994 | Crawford et al. | |
| 5,379,357 A | 1/1995 | Sentsui et al. | |
| 5,384,635 A | 1/1995 | Cohen et al. | |
| 5,412,464 A | 5/1995 | Thomas et al. | |
| 5,457,998 A | 10/1995 | Fujisaki et al. | |
| 5,473,459 A * | 12/1995 | Davis | 398/141 |
| 5,491,573 A | 2/1996 | Shipley | |
| 5,497,233 A | 3/1996 | Meyer | |
| 5,500,733 A | 3/1996 | Boisrobert et al. | |
| 5,502,782 A | 3/1996 | Smith | |
| 5,592,282 A | 1/1997 | Hartog | |
| 5,604,318 A | 2/1997 | Fasshauer | |
| 5,636,021 A | 6/1997 | Udd | |
| 5,637,865 A | 6/1997 | Bullat et al. | |
| 5,663,927 A | 9/1997 | Olson et al. | |
| 5,691,957 A | 11/1997 | Spiesberger | |
| 5,694,114 A | 12/1997 | Udd | |
| 5,754,293 A | 5/1998 | Farhadiroushan | |
| 5,767,950 A | 6/1998 | Hawver et al. | |
| 5,778,114 A | 7/1998 | Eslambolchi et al. | |
| 5,936,719 A | 8/1999 | Johnson et al. | |
| 5,975,697 A * | 11/1999 | Podoleanu et al. | 351/206 |
| 5,982,791 A | 11/1999 | Sorin et al. | |
| 5,991,479 A | 11/1999 | Kleinerman | |
| 6,072,921 A | 6/2000 | Frederick et al. | |
| 6,075,628 A | 6/2000 | Fisher et al. | |
| 6,115,520 A | 9/2000 | Laskowski et al. | |
| 6,194,706 B1 | 2/2001 | Ressl | |
| 6,195,162 B1 | 2/2001 | Varnham et al. | |
| 6,269,198 B1 | 7/2001 | Hodgson et al. | |
| 6,269,204 B1 | 7/2001 | Ishikawa | |
| 6,285,806 B1 | 9/2001 | Kersey et al. | |
| 6,315,463 B1 | 11/2001 | Kropp | |
| 6,381,011 B1 | 4/2002 | Nickelsberg et al. | |
| 6,459,486 B1 | 10/2002 | Udd et al. | |
| 6,487,346 B2 | 11/2002 | Nothofer | |
| 6,594,055 B2 | 7/2003 | Snawerdt | |
| 6,625,083 B2 | 9/2003 | Vandenbroucke | |
| 6,628,570 B2 | 9/2003 | Ruffa | |
| 6,788,417 B1 | 9/2004 | Zumberge et al. | |
| 6,859,419 B1 | 2/2005 | Blackmon et al. | |
| 7,110,677 B2 | 9/2006 | Reingand et al. | |
| 7,397,568 B2 | 7/2008 | Bryce et al. | |
| 7,548,319 B2 | 6/2009 | Hartog | |
| 7,656,535 B2 | 2/2010 | Healey et al. | |
| 7,697,795 B2 | 4/2010 | Heatley et al. | |
| 2001/0028766 A1 | 10/2001 | Hatami-Hanza | |
| 2002/0196447 A1 | 12/2002 | Nakamura et al. | |
| 2003/0103211 A1 | 6/2003 | Lange et al. | |
| 2003/0117893 A1 | 6/2003 | Bary | |
| 2003/0174924 A1 | 9/2003 | Tennyson | |
| 2004/0027560 A1 | 2/2004 | Fredin et al. | |
| 2004/0113056 A1 | 6/2004 | Everall et al. | |
| 2004/0201476 A1 | 10/2004 | Howard | |
| 2006/0256344 A1 | 11/2006 | Skora et al. | |
| 2007/0009600 A1 | 1/2007 | Edgren et al. | |
| 2007/0065150 A1 | 3/2007 | Skora et al. | |
| 2007/0264012 A1 | 11/2007 | Healey et al. | |
| 2008/0013161 A1 | 1/2008 | Tokura et al. | |
| 2008/0018908 A1 | 1/2008 | Healey et al. | |
| 2008/0123085 A1 | 5/2008 | Sikora et al. | |
| 2008/0166120 A1 | 7/2008 | Heatley et al. | |
| 2008/0219093 A1 | 9/2008 | Heatley et al. | |
| 2008/0219660 A1 | 9/2008 | Healey et al. | |
| 2008/0232242 A1 | 9/2008 | Healey et al. | |
| 2008/0278711 A1 | 11/2008 | Sikora et al. | |
| 2009/0014634 A1 | 1/2009 | Sikora et al. | |
| 2009/0097844 A1 | 4/2009 | Healey | |
| 2009/0103928 A1 | 4/2009 | Healey et al. | |
| 2009/0135428 A1 | 5/2009 | Healey | |
| 2009/0252491 A1 | 10/2009 | Healey | |
| 2009/0274456 A1 | 11/2009 | Healey et al. | |

FOREIGN PATENT DOCUMENTS

| | | |
|---|---|---|
| EP | 0 360 449 A2 | 3/1990 |
| EP | 0 364 093 | 4/1990 |
| EP | 0364093 | 4/1990 |
| EP | 0 376 449 A1 | 7/1990 |
| EP | 0 377 549 | 7/1990 |
| EP | 0 513 381 | 11/1992 |
| EP | 0513381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1 236 985 | 9/2002 |
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 2001-194109 | 7/2001 |
| WO | WO 93/25866 A1 | 12/1993 |
| WO | WO 97/05713 A1 | 2/1997 |
| WO | WO 01/67806 A1 | 9/2001 |
| WO | WO 02/065425 A1 | 8/2002 |
| WO | WO 03/014674 A2 | 2/2003 |

WO WO 2005/008443 A2 1/2005

OTHER PUBLICATIONS

International Search Report for PCT/GB2005/003594 dated Dec. 16, 2005.
International Search Report mailed Jan. 14, 2005 in International Application No. PCT/GB2004/004169.
UK Search Report dated Dec. 4, 2003 in GB Application No. GB 0322859.0.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
International Search Report dated Nov. 22, 2005.
UK Search Report mailed Dec. 1, 2005.
International Search Report mailed May 8, 2006 in PCT/GB2006/000750.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
International Search Report mailed Jan. 14, 2005 in International Application No. PCT/GB2004/004169.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
International Search Report dated Mar. 15, 2006, mailed Mar. 24, 2006 in PCT/GB2005/004873.
International Search Report dated May 16, 2006 in PCT/GB2005/004850.
International Search Report mailed Apr. 13, 2007 in PCT/GB2007/000360.
International Search Report mailed Apr. 18, 2007 in PCT/GB2007/000343.
International Search Report mailed May 2, 2007 in PCT/GB2007/000359.
International Search Report mailed Jul. 17, 2007 in PCT/GB2007/001188.
International Search Report mailed Jul. 27, 2006 in PCT/GB2006/001993.
International Search Report mailed Jun. 30, 2006, dated Jun. 7, 2006, in PCT/GB2006/001173.
International Search Report mailed May 29, 2006 in PCT/GB2006/000759.
International Search Report mailed Sep. 15, 2005 and Written Opinion of the International Searching Authority in International Application No. PCT/GB2005/001269.
International Search Report mailed May 24, 2006 in PCT/GB2006/001325.
UK Search Report dated May 24, 2005 in GB506591.7.
Notice of Allowance dated Dec. 8, 2009 in U.S. Appl. No. 11/885,275.
Office Action dated Mar. 25, 2009 in U.S. Appl. No. 11/885,275.
Notice of Allowance dated Mar. 3, 2010 in U.S. Appl. No. 11/885,400.
Office Action dated Jan. 14, 2009 in U.S. Appl. No. 11/885,400.
Office Action dated Jul. 7, 2009 in U.S. Appl. No. 11/885,400.
Notice of Allowance dated Oct. 6, 2009 in U.S. Appl. No. 11/403,200.
Office Action dated Jan. 23, 2009 in U.S. Appl. No. 11/403,200.
Office Action dated Jun. 6, 2008 in U.S. Appl. No. 11/403,200.
Office Action dated Aug. 23, 2007 in U.S. Appl. No. 11/403,200.
Office Action dated Nov. 25, 2009 in U.S. Appl. No. 11/916,054.
Office Action dated May 14, 2009 in U.S. Appl. No. 11/916,054.
Office Action dated Feb. 23, 2010 in U.S. Appl. No. 10/594,433.
Office Action dated Aug. 3, 2009 in U.S. Appl. No. 10/594,433.
Office Action dated Jan. 26, 2010 in U.S. Appl. No. 11/791,927.
Office Action dated Jul. 8, 2009 in U.S. Appl. No. 11/791,927.
Notice of Allowance dated Sep. 21, 2009 in U.S. Appl. No. 11/791,923.
Advisory Office Action dated Aug. 10, 2009 in U.S. Appl. No. 11/791,923.
Office Action dated Feb. 26, 2009 in U.S. Appl. No. 11/791,923.
Office Action dated Sep. 5, 2008 in U.S. Appl. No. 11/791,923.
Office Action dated Mar. 10, 2010 in U.S. Appl. No. 11/663,954.
Office Action dated Nov. 13, 2009 in U.S. Appl. No. 11/663,954.
Office Action dated Mar. 8, 2010 in U.S. Appl. No. 11/663,957.
Office Action dated Sep. 3, 2009 in U.S. Appl. No. 11/663,957.
U.S. Appl. No. 11/403,200; filed Apr. 13, 2006, Sikora et al.
U.S. Appl. No. 11/663,954; filed Mar.28, 2007, Sikora et al.
U.S. Appl. No. 11/663,957; filed Mar. 28, 2007, Healey et al.
U.S. Appl. No. 11/791,923; filed May 31, 2007, Healey et al.
U.S. Appl. No. 11/791,927; filed May 31, 2007, Sikora et al.
U.S. Appl. No. 11/885,275; filed Aug. 29, 2007, Heatley et al.
U.S. Appl. No. 11/885,400; filed Aug. 27, 2007, Heatley et al.
U.S. Appl. No. 11/887,382; filed Sep. 28, 2007, Healey et al.
U.S. Appl. No. 11/916,054; filed Nov. 30, 2007, Sikora et al.
U.S. Appl. No. 11/918,434; filed Oct. 12, 2007, Healey et al.
U.S. Appl. No. 12/280,038; filed Aug. 20, 2008, Healey.
U.S. Appl. No. 12/280,047; filed Aug. 20, 2008, Healey.
U.S. Appl. No. 12/280,051; filed Aug. 20, 2008, Healey.
U.S. Appl. No. 12/295,784; filed Oct. 2, 2008, Healey et al.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates in Coherent OTDR," Electronics Letters, vol. 20, No. 11, May 24, 1984.

* cited by examiner

# SECURE OPTICAL COMMUNICATION

This application is the US national phase of international application PCT/GB2004/004169 filed 29 Sep. 2004 which designated the U.S. and claims benefit of GB 0322859.0, dated 30 Sep. 2003, the entire content of which is hereby incorporated by reference.

BACKGROUND

1. Technical Field

The present invention relates to a method and apparatus for the communication of data, in particular for the secure communication of data.

2. Related Art

It is known to encrypt data in order to reduce the risk of unauthorised access to the data when the data is being transmitted over a link. However, such encryption methods can be complicated or processor intensive.

BRIEF SUMMARY

According to one aspect of the present invention, there is provided a method of communicating between a first location and a second location, the method including the steps of: at the first location, generating output signals having an irregular component, and copying the output signals at least in part such that for each output signal, there is a pair of signal copies, the irregular component being common to each of the signal copies of a pair; transmitting, from the first location, each signal copy of a pair over a common communications link; at the second location, mixing data onto the irregular component of a signal copy for at least some of the pairs of signal copies; and, at the first location, receiving signal copies from the second location and, for pairs of signal copies, combining the respective irregular components of the signal copies of a pair in order to extract the data mixed at the second location.

Because the output signals have an irregular component, and because the data to be communicated from the second location to the first location is mixed with the irregular component, it will be difficult for a person wishing to eavesdrop on a communication to distinguish the transmitted data from the irregular component.

The source may be an optical source, the output signals from the source being optical signals. In this case, the communications link will preferably be an optical cable, each signal copy of a pair being transmitted over the same optical cable. The method can then advantageously be implemented in a Passive Optical Network (PON), The first and second locations being respectively sited at the respective head end and outstation of the PON. Furthermore, in such PON networks, each outstation can be connected to the head end by a respective fibre path, signals being carried along the path in both directions between the head end and the outstation. The communications link may be an optical cable having a plurality of optical fibre, or the link may be formed by a cable which carries data along a single fibre.

In order to make it yet more difficult for an eavesdropper to obtain data being carried along the communications link, the irregular component will preferably be random, or pseudo random (by pseudo random, it is meant that although in theory a component is possible to predict, the time or processing power required to do this will make it in practice impossible to predict). If the output signal has a waveform, the irregular component may be provided by the phase of the waveform, provided that the waveform has randomly occurring phase changes, the phase changes preferably occurring smoothly, for example on a time scale commensurate with the coherence time of a source. In the case where the signals are optical, a source for such a waveform can conveniently be provided by an optical source having a short coherence time, preferably less than 10 pico seconds or even less than 1 pico second. However, the source may be an electrical source for providing electrical signals, which electrical signals may be analogue signals with a waveform. Alternatively, the electrical signals may be digital.

If the signals have a waveform, the step of mixing data onto the irregular component of the waveform will preferably be carried out through phase modulation. This will make it difficult for a person attempting to eavesdrop to distinguish the phase modulation from the randomly occurring phase changes.

The combination of the irregular components of a pair of signals may be a mathematical operation carried out on the components. For example, the combination may be an addition, or a comparison between components, such as a subtraction. However, if the irregular components have a waveform, the combination will preferably be the interference of two waveforms, for example the interference (or combination) of a modulated irregular component with the unmodulated copy of that irregular component. If the signals are optical, the interference will preferably be accomplished by allowing the two signals to mix. However, if the signals are electrical, the interference may be accomplished by mathematically summing the irregular components of the two signals, or by summing the two signal themselves.

Preferably, the copies of a pair of signals will be delayed relative to one another at the first location, such that a leading copy and a trailing copy are transmitted from the first location, the leading copy arriving at the second location before the trailing copy. This will make it easier for only one of the signal copies of a pair to have data modulated or otherwise mixed therewith at the second location. The signal copy can then be returned to the first location, where the trailing copy will preferably be delayed relative to the previously leading copy, such that both copies can be combined substantially in step with one another. In a preferred embodiment, the output from the optical source is fed to an interferometer stage, such as an un-balanced Mach Zehnder interferometer, where the signal is copied, one copy being channeled to one path of the interferometer, whilst the other copy is channeled to another path of the interferometer, the transit time associated with each path being different, such that a relative or differential delay results between the time at which the signal copies are transmitted from the interferometer stage. The same interferometer stage can then be employed to re-align to returned signal copies of a pair in a particularly convenient manner, since the relative delay imposed in the outbound direction will be the same as the relative delay imposed in the return direction, this being in each case determined by the difference in the transit times of the two paths.

The time scale of the irregularity will preferably be shorter than the differential delay, since this will make it difficult of extract data unless the delay is know. The longer shorter the time scale in relation to the delay, the harder it will be to extract data without knowing the delay. Thus the delay acts a key when it is longer than the time scale of the irregularity. Importantly, the key is never transmitted, and the actual value of the delay need not be known (it could be machine-chosen in a random or pseudo random fashion, for example). Because the delay is greater than the time scale of the irregularities, the data will preferably be applied in a burst mode fashion to make it easier to extract the applied data.

The signal will preferably be output from the source as a continuous stream. Signals may have predetermined respective positions within the streams, which respective positions may be specified by markers. However, the signals will preferably not have predetermined respective positions within a stream, the position of a signal in a stream being determined by the time at which the signal is modulated at the second location, the duration of the signal being determined by the duration of the modulation. Likewise, the position in a stream of the other signal of a pair will preferably be determined by the position in the stream of the modulated signal, and the differential delay.

The signals will preferably be reflected at a point along the link in order to return the signals to the first location. Modulation or other mixing of a signal with data may be carried out at the location where the signals are reflected, for example if a modulator having a reflective end surface is used, which end surface will provide a termination to the link. Alternatively, modulation or other mixing may be carried out at a point remote from where the signals are reflected.

The times at which data is modulated on to (carrier) signals will preferably be chosen such that when signal copies return to the first location, a modulated signal is combined with a signal having the same but unmodulated irregular components. That is, for each pair of signal copies that are combined, one signal of the pair will be modulated, whereas the other copy of the pair will not be modulated. The data will preferably be modulated in burst mode, such that between periods when data is being modulated, there are quiet intervals during which data is not being modulated. Such quiet intervals will allow carrier signals to return to the first location without modulation, in order to be combined with a corresponding modulated signal. Preferably, the modulation periods will occur at regular intervals, and will be of predetermined duration. To reduce the risk that two signal copies of a pair, each of which has data modulated thereon, will be mixed together, the duration of quiet periods may be chosen in dependence on the differential delay imposed at the first location. In a preferred embodiment, the duration of the quiet periods will be greater than the differential delay. The duration of the modulation periods will preferably also be chosen in dependence on the differential delay, in on embodiment the periods of modulation each being shorter than the differential delay.

The differential delay will preferably be chosen in dependence on the average coherence time of the source. The differential delay will preferably be much longer than the coherence time, in order to make it difficult for an unauthorised person to extract data. Preferably, the ratio of the differential delay to the coherence time will be greater or equal to $10^3$, yet more preferably $10^5$ or even yet more preferably $10^7$ or $10^9$.

Preferably, there will be provided at the second location, a data input for introducing content data to be modulated or otherwise mixed onto the irregular component of a signal. The content data may be audio data, video data, multimedia data, text data, numerical data or other data.

BRIEF DESCRIPTION OF THE DRAWINGS

Further aspects of the invention are provided in the appended claims. The present invention will now be described in further details below, by way of example, with reference to the following drawing in which:

DETAILED DESCRIPTION OF EXEMPLARY EMBODIMENTS

Figure 1:
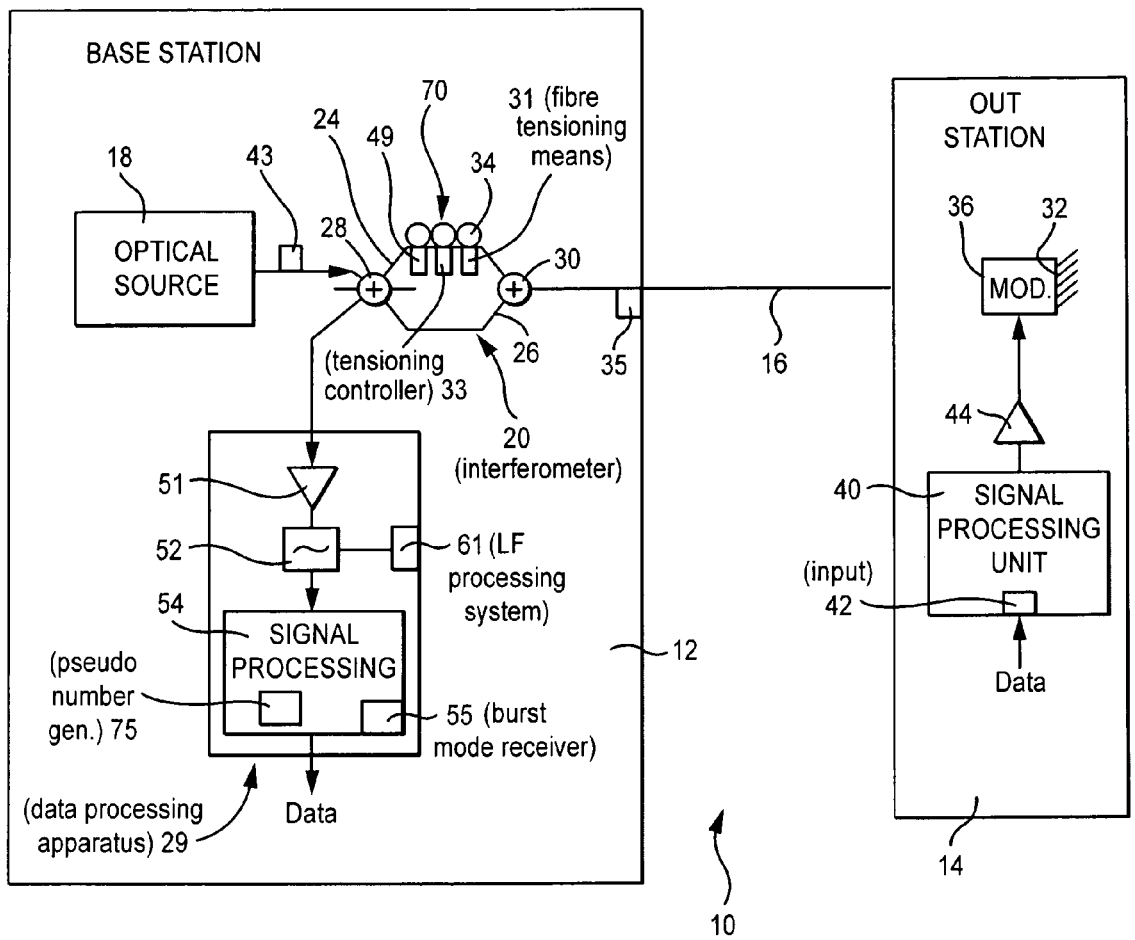
FIG. 1 shows a communications system according to the present invention.

FIG. 1 shows a secure communications system in which a base station 12 can receive data from an outstation 14, over an optical communications link 16 extending between the base station 12 and the outstation 14. The base station 12 includes an optical source 18 with a short coherence time. Wavetrain portions also known as carrier signals (hereinafter referred to as signals) from the optical source 18 are fed to an interferometer stage 20, here a Mach-Zehender interferometer having a first path 24 and a second path 26. The interferometer 20 includes first coupling stage 28 for coupling optical radiation between the optical source 18, the first and second paths 24, 26, and data processing apparatus 29. For light travelling in a forward direction, that is, towards the outstation 14, the first coupling stage 28 acts as a directional power (intensity) splitter, channeling light from the optical source 18 to each of the paths 24, 26, the power to each path being shared in a predetermined manner. In the present example, the first coupling stage acts as a 50:50 power splitter, the power input to each path being equal. Consequently, for each signal provided by the optical source 18 in a given time interval, that signal is copied such that there is a first copy and a second copy, the first and second copies being duplicates of one another. One copy travels along the first path 24 whilst the other copy travels along the second path 26. A second coupling stage 30 is provided for coupling light between the first and second paths 24, 26 and an output 35 of the interferometer, which output is connected to the transmission link 16. For light travelling in the forward direction, the coupling stage 30 acts as a combiner, combining the light from the first and second paths and channeling this combined light to the interferometer output 35. The first path of the interferometer has a delay stage 34 for increasing the transit time of light travelling therealong between the first and second coupling stages 28, 30, such that the transit time for light travelling between the coupling stages 28, 30 is higher along the first path 24 than it is along the second path 26. For each signal produced by the optical source, the interferometer 20 serves to delay one of the signal copies relative to the other signal copy, the signal copies being transmitted onto the link 16 at different times relative to one another.

The additional (differential) delay imposed by the delay stage 34 is much greater than the coherence time of the optical source 18. Thus, when light travelling along the first and second paths is recombined by the second coupling stage 30, the interference between light travelling along the two paths averages out, such that on average (over a timescale much greater than the coherence time) the amplitude of light upon recombination at the second coupling stage 30 is equal to the amplitude of light from the optical source 18 (neglecting any losses in the interferometer 20 or coupler(s) due to absorption or backscattering, for example).

The outstation 14 comprises reflector means, such as a reflecting surface 32 for returning signals to the base station 12. Alternatively, the reflector means may be formed by a loop, the end of the fibre link 16 being connected to a point along the fibre at a 3-way coupler or circulator so as to form the loop. Modulator means 36 are also provided, the modulator means 36 being arranged in the path of the return signals so as to modulate the return signals with data.

For return signals travelling in the return direction, that is, for return signals arriving at the interferometer 20 from the outstation 14, the second coupling stage 30 act as a power splitter, in a similar fashion to the action of the first coupling stage 28 on light in the forward direction from the optical source 18. The first coupling stage 28 then serves to combine light from the first and second paths in the return direction, channeling the combined light to the data processing apparatus 29. In this way, return signals are copied at the second coupling stage 30, one copy being channeled along the first path 24, whilst the other copy is channeled along the second path 26.

For each signal generated by the source 18, there are four duplicates of this signal: a non-retarded signal S0 which has traveled along the second path 26 of the interferometer 20 in both the forward and reverse directions; a first retarded signal S1 delayed by a delay D in the forward direction (but not the reverse direction); a second retarded signal S2 retarded by the delay D in the reverse direction (but not the forward direction); and, a twice-retarded signal S3 retarded by a delay 2D, signal S3 being retarded in each of the forward and reverse directions.

The first and second retarded signals S1, S2 which are retarded in one direction only will be returned to the first coupler stage 28 at the same time. In the absence of any modulation at the outstation 14, these signals are copies of one another and the signals will interfere or otherwise combine constructively at the first coupler stage 28. However, if one of the signals is modulated with data, in particular if one of the pair of signals S1, S2 is phase modulated with data, the interference between the two signals will result in a signal which is representative of the modulating data.

Because the optical source 18 has a low coherence time, signals from the source will be formed from wavetrains where phase changes occur randomly at irregular time intervals. It will therefore be difficult to distinguish any phase modulation imposed on a wavetrain from the random phase changes in the signal itself, thereby allowing for secure communication over the link 16. Furthermore, because of the random nature of the signals from the optical source, constructive interference can only be obtained when duplicate copies of the same portion of the signal stream are combined such that corresponding phase changes in each copy are in step with one another (within a tolerance level). Otherwise, if a portion of the signal stream generated from the source is combined with a portion of the signal stream generated at another time, the resulting combination will be a random or pseudo random signal or other noise from which it will be difficult to detect any phase modulation of either one of the two signal portions. Likewise, if the phase jumps in duplicate copies of the same portion of signal stream are not in registry, the combination of the two portions will also result in noise being generated, thereby masking any modulating data in one of the portions. Therefore, to extract data without excessive difficulty from a phase-modulated signal portion travelling along the transmission link 16, it is necessary to (a) combine the modulated signal portion with a copy of the same signal portion which has not been modulated, and (b) combine the two portions such that the phase jumps are in registry (to within a level of tolerance).

The optical source 18 produces a continuous optical stream, and so the transmission link 16 will carry two duplicate signal streams in the forward direction, one stream lagging the other by the differential delay D of the first interferometer path 24. If at the outstation 14 the incoming signal streams are reflected by the reflector 32 and modulated by the modulating means for a time interval, for each portion of modulated signal stream, there will be a corresponding portion that is un-modulated, the un-modulated portion lagging the modulated portion by the differential delay D (the modulated portion is surrounded by unmodulated portions whose duration is greater than D). In the return direction, the interferometer 20 will delay the modulated portion and will cause the modulated and un-modulated portions (S1 and S2) to interfere such that the modulated data can be extracted. By combining the modulated and un-modulated signal portions at the first coupling stage such that the two signal portions interfere, a further signal is generated, which further signal has an amplitude modulation corresponding to the phase modulation in the modulated portion. Thus, by converting phase modulation into amplitude modulation, any data in the phase modulation can be extracted.

However, an unauthorised person wishing to obtain the data by tapping the transmission link signal 16 will need to know the delay between the modulated and un-modulated signal portions, in order to combine these in registry with one another (the modulated portion is surrounded by unmodulated portions whose duration is greater than D). In contrast, the data can easily be extracted at the base station 10, since the delay stage 34 employed for causing the differential delay by retarding one of a pair of signal portions is itself used for cancelling this differential delay by retarding the other of the two signal portions.

To control the modulation of signal stream at the outstation 14, there is provided a signal processing unit 40, the signal processing unit having a data input 42 for receiving data which is to be modulated on the signal stream. The signal processing unit 40 will be configured to modulate data in burst mode, the duration of modulation bursts or periods being less than the differential delay D, the time between bursts (i.e., the non-modulation periods) being longer than the differential delay. This will reduce the risk that two modulated signal portions will be combined. The signal processing unit 40 is coupled to a modulation driver 44, which modulation driver 44 in turn controls the operation of the modulator 36. The modulator will preferably be a Lithium-Niobat, or other modulator operating according to the electro-optic effect.

The light source may be a Light Emitting Diode, a Fabry-Perot Laser Diode, or a source of amplified spontaneous emission such as an Erbium-Doped Fibre Amplifier or a Semiconductor Optical Amplifier, but preferably the light source will be a Super Luminescent Diode, since this has a broad and smooth power spectrum, and a short coherence time of about 0.5 ps or less. The radiation produced by the optical source will preferably be unpolarised, or alternatively a de-polarising unit 43 may be provided between the light source and the interferometer, for de-polarising the light before the light is injected into the interferometer (the de-polarising unit may be for example, a Fibre Lyot de-polariser). A polarisation controller 49 will preferably be provided in one of the paths of the interferometer, here, the first path, so that the polarisation of light from the first path combining in the return direction at the first coupler 28 is at least partially aligned with that of the light from the other path.

The data processing apparatus 29, receives from the coupling stage 28 an optical interference (combination) signal produced at the first coupling stage as a result of interference between a modulated signal portion and an un-modulated signal portion. The data processing apparatus 29 is configured to convert the optical interference signal from the first coupling stage into a data signal from which the content input at the outstation 14 can readily be obtained. The data processing apparatus includes: a photo-receiver 51 coupled to the first coupling stage 28 for converting optical signals into electrical signals; a filter 52 for receiving electrical signals from the photo-receiver 51 and filtering the electrical signals; and, a signal processing unit 54 for processing the filtered electrical signals. The filter 52 will be configured to remove frequencies likely to impede the extraction of the transmitted data from the outstation. In particular, the filter will be configured to remove noise, having a transmission bandwidth of 700 Mz for a transmission rate of 1 Gbit/s.

The purpose and operation of the signal processing apparatus 29 and the signal processing unit 40 can generally be described as follows. At the transmitter it is useful to form a burst-mode data packets of the correct duration (P) and separation (G). It is also useful to encode the data using a line-code such as "Bi-phase Mark" which is tolerant of transmission polarity ambiguity. The packet may also carry synchronisation and clock information—as is well known in the art of data transmission. The modulator driver 44 is used to drive the phase modulator 36 (for example a Lithium Niobate phase modulator) with a suitable voltage in order to give the desired phase modulation depth. The modulation depth may be varied in order to optimise the overall system performance in terms of signal to noise ratio. At the signal processing apparatus 29, the signal is first filtered by the filter 51, the transmission bandwidth thereof being chosen so as to match the data modulation spectrum of the received signal. (The filter may also be used to separate low frequency components due to background disturbances onto a separate signal processing system 61). The (receiving) signal processing unit 54 at the base station 12 comprises a burst mode receiver 55, matched to the (transmitting) signal processing unit 40 at the outstation 14, which performs the functions of clock recovery, burst synchronisation, decoding of the line-code in order to recover the transmitted packet, and selection of one of the two copies of the received data packet. The burst mode receiver 55 might also be used to re-assemble the received data into a continuous data stream. Other functions such as error detection/correction may also be applied at the burst mode receiver 55. The paths 24, 26 of the interferometer 20 are formed by optical fibre, the delay stage 34 of the first path being a portion of fibre, such that the length of fibre forming the first path 24 is greater than that of the second path 26, in order to introduce the differential delay D in the first path. Typically, the fibre portion of the delay stage 34 will be several km in length. If the coherence length of the source is about 0.5 pico seconds (corresponding to an optical bandwidth of about 10 nm), the length of fibre traveled in a typically coherence time is about 0.1 mm in optic fibre (this length being the coherence of the wavetrains in the fibre).

To extract the data carried over the link 16, the differential delay should be known to within plus or minus kL, where k is a scaling factor less or roughly equal to 3. Thus, for a delay line of 10 km, the accuracy to which the length of the delay line must be reproduced in order to extract the data (using another interferometer to the interferometer used to cause the differential delay) is about one part in $10^8$. Thus, by using a very high ratio of D/L, it makes it unlikely that a person tapping the link 16 will be able to ascertain the correct value of D, in particular to the necessary accuracy to extract the data.

Figure 3:
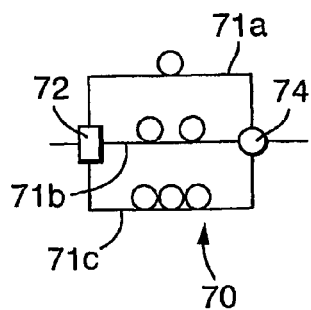

To further increase security, variable delay means 70 may be provided. For example, the delay stage may have means for changing the length of the delay, so that if an unauthorised person succeeds in determining the correct value of the delay, the delay will only be valid for a limited time. To change the delay, tensioning means 31 may for example be provided to stretch the length of fibre forming the delay stage. To control the tensioning means 31, a controller 33 coupled to the signal processing unit 54 may be provided. Alternatively, as shown in FIG. 3, the variable delay means 70 may be formed by a plurality of delay paths 71*a, b, c*, each of which extends between a switch coupler 72 and a junction 74. The delay paths each have a different length, so as to impose a different differential delay. The first, second, and third delay paths 71*a, b, c* of FIG. 3 may have respective lengths of 8, 10 and 15 km, although different lengths or different ratios between the lengths may be chosen so as to make it more difficult for the differential delay D to be worked out. The switch coupler 72 will be configured to selectively route radiation from the source 18 to one of the delay paths 71*a, b, c*, such that the differential delay D can be changed by changing the path. The variable delay means 70 will preferably be arranged within one of the paths of the interferometer 20, such that any one of the delay paths forms part of the first or second path of the interferometer. Although only three delay paths are shown, the delay stage 70 may have many more delay paths, for example 10 or 100 delay paths, to make it yet more difficult for the lengths of the paths to be ascertained. The switch coupler 72 or other control means 33 for controlling the differential delay D will be coupled to the signal processing unit 54 of the base station 12. The signalling unit 54 will send control signals to the switch coupler 72 (or control means 33) to change the delay between the receipt of data pulses when data is transmitted in burst mode. Thus, the delay will be changed in time intervals during which data is not be received. Preferably, the delay will be changed between each pulse, so that if an eavesdropper manages to ascertain the value of D for one pulse of data, that value will have changed when a subsequent pulse is transmitted. The signal processing unit 54 will preferably be arranged to select the differential delay D in a random or pseudo random fashion, making it yet more difficult for the delay to ascertained. To achieve random or pseudo random selection, the data processing unit 54 will be equipped with a random or pseudo data or number generator 75.

Unlike other known systems for transmitting data securely, there is no need for a key to be known by both the person transmitting data and the person receiving data. Thus, the differential delay, which represents a "key", does not need to be known at the remote station: only at the base station receiving the data is it needed for the "key" to be kept. Even at the base station receiving the data, although it is likely that the delay D can be ascertained, the delay D can in fact be kept secret, and need not be known by any person since the delay imposed by the delay stage is the same for outbound signals as it is for inbound signals. Even if a person at the base station were to attempt to measure the length of fibre forming the delay stage, that person would be unlikely to be able to measure it to a sufficient level of accuracy in order to obtain the differential delay D precisely enough to use this value to extract data.

Typically, a system as shown in FIG. 1 is likely to support transmission rates about 1 Gbit/s (burst rate), whilst still retaining a high degree of data security. The maximum data modulation bandwidths is likely to be limited by a number of factors: (i) the effects of fibre dispersion (which will depend on the spectral width and the transmission wavelengths of the source); (ii) the power level of the source, since the sensitivity of a photo-receiver such as a PIN FET will decrease with increasing bandwidth, and, (iii) any limitations imposed by the encoding/processing by the signalling unit 44.

Typically, the source will operate at a wavelength of around 1.3 microns, in order to efficiently make use of standard telecommunications optical fibre, such fibre being configured to support single mode transmission at this wavelength. Typically, the fibre will have a single core of a diameter which is around 9 or 10 microns. However, dispersion-compensating fibre may be employed, in which case the source may transmit at a wavelength of 1.55 microns. Typically, the length of fibre employed to connect the base station to an outstation will be at least 1 km, normally at least 10 km, fibre lengths of over around 50 km or 60 km being possible. Clearly, fibre length are not limited to 50 km or 60 km.

Figure 2:
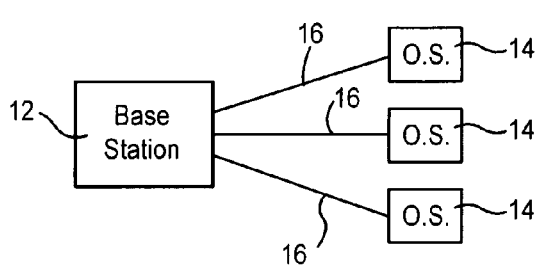
FIG. 2 shows a star network in which the present invention can be employed; and, FIG. 3 shows a variable delay stage.

Because the present system allows communication over an existing fibre, the system may conveniently be used with existing communication structures. In particular, the system may be used with a passive optical network, as shown in FIG. 2, where the base station 12 is connected to a plurality of outstations 14, each of which is connected to the base station by a respective fibre. In such a situation, the second coupling means 30 of FIG. 1 will be adapted to couple the first and second paths to a plurality of transmission links 16.

The apparatus shown in FIG. 1 may also be employed to determine if the transmission link 16 has been physically disturbed, for example by an acoustic vibration. Such physical disturbance is likely to result in a change in the transmission properties of the link. In particular, in the case of an optical fibre link, a physical disturbance is likely to result in strain which will change the optical path link of the strained portion of the fibre, either through a change in the refractive index, polarisation or a change in the physical length, or both. Information signals generated by such disturbances will normally have a different frequency to those of the data signals modulated onto the data link.

A physical disturbance in the link, in particular an optical fibre link 16 is likely to result in an interference or combination signal from the first coupling stage 28, since when a disturbance occurs, the disturbance is likely to cause a phase and/or amplitude modulation in one to the (carrier) signals travelling along the link. However, unlike the data modulation, a disturbance is unlikely to operate in burst mode, with the result that the combination of signals will be the result of interference between on the one hand a carrier signal having been modulated by the disturbance at one time, and on the other hand, a signal modulated by the disturbance at another time, the two times being separated by the differential delay D. However, a disturbance is likely to increase the level of background noise. The signal processing system 61 can then detect a disturbance by monitoring the background noise and detecting an increase in the background noise beyond a threshold value, noise levels beyond this threshold value being deemed indicative of a disturbance.

A disturbance is likely to change the spectrum of background "noise" as well as the level of noise, such that different disturbances will have different characteristic spectrum types. The distance between the base station and the point where a disturbance is occurring may also affect the spectrum. The signal processing signal 61 may therefore be configured to compare the noise spectrum at intervals with stored spectrum signatures for known disturbances, and to generate a disturbance alert signal if a monitored spectrum is found to match one of the known signatures. Alternatively, or in addition, the signal processing system 61 may be configured to run a learning algorithm in order to learn the characteristic spectrum types for different disturbances experienced along the particular optical fibre path which is being monitored The first coupling stage 28, at the source side of the interferometer, will preferably be a 3×3 coupler (with some ports terminated), whereas the second coupling stage 30, at the transmission side, will preferably be a 2×2 coupler, with one port terminated. The 3×3 coupler is used in order to create a relative phase bias of $\phi_b=120°$ between the optical fields on its output ports. This can be used to improve the sensitivity of the interferometer when detecting disturbances due to cable handling, street works or unauthorised interference. (We denote the phase modulation due to a disturbance as $\phi_d(t)$.) The 3×3 is not essential for the data transmission mode, where a 2×2 coupler could be used—in this case $\phi_b=180°$. It can be shown that the receiver ac output signal is proportional to: $r_{ac}(t)= k \cdot \mathrm{Cos}\{\phi_b+\phi_d(t)+\phi_m(t)\}$ where, k is a constant of proportionality and $\phi_m(t)$ is the data phase modulation signal. The equation shows how the phase bias can be used to select a higher slope region of the Cosine function in order to improve the sensitivity when the magnitude of the disturbance is small. It also shows how the disturbance can also give rise to a data ambiguity. It can also be shown that the output signal $r_{ac}(t)$ will have opposite polarity for the two copies of the modulated signal since they are incident on different arms of the interferometer.

The apparatus shown in FIG. 1 may be used for monitoring a fibre, without necessarily being used for the secure transmission of data. In such a situation, the optical source may be a source having a long coherence length, irregular signals not being required for monitoring the fibre link 16. Features of the implementation for secure transmission are applicable mutatis mutandis to the monitoring of a fibre link.

In conclusion, the embodiment of FIG. 1 can be described in the following terms. FIG. 1 shows a block schematic of the secure single-mode fibre transmission system and sensor. It comprises a low-coherence broadband light source. Ideally, the light source generates un-polarised light, or its light is de-polarised before injecting into the interferometer (for example, by using a Fibre Lyot de-polariser). Light from the source is coupled into an un-balanced Mach-Zehender interferometer employing a 3×3 port coupler on its input leg. The two optical paths in the Mach-Zehender interferometer have a differential delay 'D' which may be due to several km of optical fibre (the exact length does not need be known providing D>>τ–the coherence time of the source). Thus, in the forward direction, the couplers act as simple power splitters and provide two copies of the source signal to the remote reflection-mode optical phase modulator (one delayed by D relative to the other). These are phase modulated and returned to the interferometer where they undergo a further differential delay D which creates two copies of the modulated signals (giving four signals in total). Due to the action of the differential delay, two of these copies are now in phase synchronism and will therefore undergo coherent mixing when their polarisations are aligned. This mixing (or interference effect) converts the phase modulated data imparted at the remote reflection modulator into intensity modulation at the interferometer output port. The phase modulation can only be recovered when an interferometer with a differential delay equal to D±k·τ is used (where k is a scaling factor <~3). For an incoherent source with an optical bandwidth of 12 nm, τ corresponds to a coherence length of order 0.1 mm.

To help in further understanding an embodiment of the present invention, the aspects of an embodiment can be described in the following terms. The differential delay D in the unbalanced Mach-Zehender interferometer results in there being two copies of the optical source signal at the remote phase modulator separated in time by D. As D>>τ (the coherence time of the source) these two source signals are effectively un-correlated at this point. Both signals are phase modulated by the data and are returned to the un-balanced Mach-Zehender interferometer. This time, the interferometer creates two copies of the modulated signals—resulting in four signals in total, two on each arm. Consider the point where these signals arrive back at the 3×3 coupler. We will find that each arm now caries a signal that has undergone one delay increment D. (This occurred on the outward journey for one of the signals, and on the return journey for the other.) Clearly, as these signals have undergone the same total propagation delay they will be correlated (or coherent) when they combine in the first (3×3) coupler. Hence they will beat-down to reveal the modulation applied at the remote terminal. (The phase modulation will be converted into amplitude modulation by the action of the interferometer.) The other signals remain un-correlated and will therefore not beat down to reveal the data modulation. The important point to recognise, however, is that the two signals which do beat down went through the remote phase modulator at different times (separated by D), hence we will have two copies of the modulation. This problem can be overcome by using burst-mode modulation such that the data packet is of duration P<D, and separated form other packets by a gap G>D. In practice, as we do not know D, we must use the following constraints:

$P<D_{min}$ $G>D_{max}$ where, $D_{min}$ and $D_{max}$ are the minimum and maximum values that D might take.

Clearly, the present invention provides a method of secure communication to reduce the risk of an eavesdropper obtaining data sent across a communication link.

The invention claimed is:

1. A method of communicating between a first location and a second location, the method comprising:
   at the first location, generating output signals having an irregular component, and copying the output signals at least in part such that for each output signal, there is a pair of signal copies, the irregular component being common to each of the signal copies of a pair;
   transmitting, from the first location, each signal copy of a pair in a common direction over a common communications link;
   at the second location, mixing data onto the irregular component of a signal copy for at least some of the pairs of signal copies; and
   at the first location, receiving signal copies from the second location and, for pairs of received signal copies, combining the respective irregular components of the signal copies of a pair in order to extract therefrom data mixed at the second location,
   wherein the data is mixed at the second location such that between periods when data is being mixed, there are quiet intervals during which data is not being mixed.

2. A method as claimed in claim 1, wherein the source is an optical source, the output signals are optical signals.

3. A method as claimed in claim 1, wherein the mixing is carried out through modulation of the irregular component.

4. A method as claimed in claim 1, wherein the irregular component is random or pseudo random.

5. A method as claimed in claim 1, wherein the output signal has a waveform, the irregular component being the phase of the waveform, the waveform having randomly occurring phase changes.

6. A method as claimed in claim 5, wherein the irregular component is random or pseudo-random and the waveform has an average phase-coherence time of less than 10 pico seconds.

7. A method as claimed in claim 6, wherein the phase-coherence time is less than 1 pico second.

8. A method as claimed in claim 5, wherein the mixing occurs through phase-modulation of the waveform.

9. A method as claimed in claim 1, wherein signal copies of a pair are transmitted over the common communications link with a delay relative to one another.

10. A method as claimed in claim 1, wherein:
    signal copies are optical signals, differential delay being caused at an unbalanced interferometer, the interferometer having a first path and a second path, the transit time of the first path being longer than that of the second path, signal copies of a pair being caused to travel along a different respective path.

11. A method as claimed in claim 10, wherein the interferometer has a first coupling stage which is coupled to the source, the coupling stage being arranged to channel one portion of the incoming radiation intensity from the source along one path, and another portion of the incoming radiation intensity along the other path, so as to form the first and second signal copies.

12. A method as claimed in claim 11, wherein the interferometer has a second coupling stage for combining radiation from the first and second paths, and for coupling the combined radiation to the common communications link.

13. A method as claimed in claim 12, wherein the signals returned from the second location are each channeled along the first and second paths by a second coupling stage, and wherein the so channeled signals are subsequently combined at the first coupling stage.

14. A method as claimed in claim 1, wherein the source is configured to produce a continuous signal stream.

15. A method as claimed in claim 14, wherein the output signals have predetermined respective positions in the signal stream.

16. A method as claimed in claim 1, wherein the signal copies are delayed relative to one another at the first location, and wherein at the second location, signals are mixed according to a burst mode protocol, in which protocol the time between bursts is larger than the duration of the differential delay.

17. A method as claimed in claim 1, wherein the signals returned from the second location to the first location are returned along the common communications link.

18. A method as claimed in claim 1, wherein signals are reflected by reflector means at the second location in order to return the signals to the first location.

19. A method as claimed in claim 1, wherein the signals are modulated at the second location.

20. A method as claimed in claim 1, including monitoring the signals returned from the second location, so as to detect whether a physical disturbance in the communications link occurs.

21. A method as claimed in claim 1, wherein:
    for each pair of out bound signal copies transmitted from the first location to the second location, one copy is delayed such that there is a leading copy and a trailing copy, there being a differential delay between the leading copy and the trailing copy, and
    for each pair of signal copies returned from the second location, the leading copy is delayed at the first location, such that when the two copies are combined, the differential delay is reduced to allow the copies to be combined substantially instep.

22. A method as claimed in claim 21, wherein a trailing copy of a signal pair is delayed at the first location by a delay stage, a leading copy of the pair in the return direction being delayed by the same delay stage in order to reduce the differential delay between the two copies.

23. A method as claimed in claim 1, wherein to combine the signal copies of a pair, the signal copies are caused to interfere.

24. A method as claimed in claim 1, wherein the signal copies of a pair have a differential time delay associated therewith, and wherein the duration of the quiet intervals is greater than the differential time delay.

25. A method as claimed in claim 1, wherein the periods during which data is mixed are each shorter than the differential time delay.

26. A method as claimed in claim 24, wherein the periods during which data is mixed are each shorter than the differential time delay.

27. A method of communicating over a data link, the method comprising:
   generating output signals having an irregular component;
   copying, at least in part, the output signals such that for each output signal there is a pair of signal copies, the irregular component being common to each of the signal copies of a pair;
   transmitting at least one signal copy of each pair in a common direction onto a common communications link;
   receiving, from a remote location, returned signal copies previously transmitted to the remote location, the irregular component of the returned signal copies having data mixed therewith; and
   combining the received signal copy of a pair with the other signal copy of that pair, such that, in dependence on the combination of the respective irregular components of two signal copies of a pair, a data signal is generated, which data signal is indicative of data mixed remotely with the returned signal copy,
   wherein the data is remotely mixed such that between periods when data is being mixed, there are quiet intervals during which data is not being mixed.

28. A method as claimed in claim 27, wherein the delay is varied randomly or pseudo-randomly.

29. A method of communicating between a first location and a second location, the method comprising:
   at the first location, copying, at least in part, an output signal received from a source such that for each output signal, there is a pair of signal copies, an irregular component being common to each of the signal copies of a pair;
   transmitting, from the first location, each signal copy of a pair in a common direction over a common communications link;
   at the second location, applying data onto the irregular component of a signal copy of at least some of the pairs of signal copies; and
   at the first location, receiving signal copies from the second location and, for each pair of signal copies, combining the respective irregular components of the signal copies from that pair in order to extract therefrom data mixed at the second location,
   wherein the data is mixed at the second location such that between periods when data is being mixed, there are quiet intervals during which data is not being mixed.

30. A communications apparatus comprising:
   a source for generating output signals having an irregular component;
   a copying stage for copying, at least in part, the output signals from the source such that for each output signal, there is a pair of signal copies, the irregular component being common to each signal copy of a pair;
   a transmission stage for transmitting the signal copies of a pair in a common direction onto a common communications link;
   a receiving stage for receiving signal copies returned from a remote location, the irregular component of at least some of the returned signals having data mixed therewith;
   a combination stage for causing respective irregular components of the returned signals to combine; and
   data processing means coupled to the combination stage, the data processing means being configured to generate in use a data signal in dependence on a combination of the of the returned signals of a pair, the data signal being representative of data, if any, carried by a returned signal,
   wherein the data is remotely mixed such that between periods when data is being mixed, there are quiet intervals during which data is not being mixed.

31. Communications apparatus as claimed in claim 30, wherein a coupling stage is provided which acts (a) as the copying stage for signals travelling in an outbound direction towards the common communications line, and (b) as the combination stage for signals travelling in a return direction from the common communications link.

32. Communications apparatus as claimed in claim 31, wherein the copying stage and the transmission stage are connected by a first path and a second path, each of the first and second paths extending between the copying stage and the transmission stage, the transit time associated with the first path being greater than the transit time associated with the second path.

33. Communications apparatus as claimed in claim 32, wherein the paths are formed by an unbalanced interferometer, preferably an unbalanced Mach-Zehender interferometer.

34. Communications apparatus as claimed in claim 30, wherein the source is an optical source having a coherence time less than a differential delay associated with a first and second path.

35. Communication apparatus as claimed in claim 34, wherein the ratio of the differential delay and the coherence time of the source is at least $10^5$, preferably at least $10^7$.

* * * * *